(12) United States Patent
Wang et al.

(10) Patent No.: US 11,754,749 B2
(45) Date of Patent: Sep. 12, 2023

(54) ATMOSPHERIC TURBULENCE DETECTION METHOD AND ATMOSPHERIC TURBULENCE DETECTION DEVICE

(71) Applicant: National Central University, Taoyuan (TW)

(72) Inventors: Sheng-Hsiang Wang, Taoyuan (TW); Kun-Hsu Wu, Taichung (TW); Sheng-Fu Hu, Taoyuan (TW)

(73) Assignee: National Central University, Taoyuan (TW)

( * ) Notice: Subject to any disclaimer, the term of this patent is extended or adjusted under 35 U.S.C. 154(b) by 22 days.

(21) Appl. No.: 17/465,860

(22) Filed: Sep. 3, 2021

(65) Prior Publication Data

US 2023/0027031 A1  Jan. 26, 2023

(30) Foreign Application Priority Data

Jul. 20, 2021  (TW) .................................. 110126535

(51) Int. Cl.
  *G01W 1/06*  (2006.01)
  *G01K 7/04*  (2006.01)
  (Continued)

(52) U.S. Cl.
  CPC ................. *G01W 1/06* (2013.01); *G01K 3/14* (2013.01); *G01K 7/04* (2013.01); *G01K 3/08* (2013.01);
  (Continued)

(58) Field of Classification Search
  CPC ............. G01W 1/06; G01W 2001/003; G01W 2203/00; G01K 3/14; G01K 7/04; G01K 3/08; G01K 2219/00
  See application file for complete search history.

(56) References Cited

U.S. PATENT DOCUMENTS 3,841,154 A * 10/1974 Mallery .................. G01W 1/08
 340/870.1
2018/0348375 A1 * 12/2018 Smolin ..................... G01J 9/04

FOREIGN PATENT DOCUMENTS

CN     1580710 A  *  2/2005
CN     1789945 A  *  6/2006
(Continued)

OTHER PUBLICATIONS

Rachmani et al. ("Computer Backplane With Free Space Optical Links: Air Turbulence Effects," J. Lightwave Technol. 30, 156-162 (2012)) (Year: 2012).*

(Continued)

*Primary Examiner* — Daniel R Miller
*Assistant Examiner* — Christian T Bryant

(57) ABSTRACT

An atmospheric turbulence detection method includes: providing a temperature difference measuring device including a thermocouple element and two sensing probes, wherein the thermocouple element has two opposite end portions, the two sensing probes are respectively disposed at the two end portions, and there is an ambient distance between the two end portions; placing the temperature difference measuring device in an atmospheric environment to generate an electromotive force by a temperature difference between the two end portions; analyzing the electromotive force to convert the electromotive force into an ambient temperature difference of an environment where the two end portions of the thermocouple element are located, an atmospheric refractive index structure constant is calculated according to the ambient temperature difference and the ambient distance, and a value of the atmospheric refractive index structure constant corresponds to an ambient disturbance of an atmospheric turbulence. An atmospheric turbulence detection device is also provided.

12 Claims, 4 Drawing Sheets

(51) Int. Cl.
G01K 3/14 (2006.01)
G01K 3/08 (2006.01)
G01W 1/00 (2006.01)

(52) U.S. Cl.
CPC ... *G01K 2219/00* (2013.01); *G01W 2001/003* (2013.01); *G01W 2203/00* (2013.01)

(56) References Cited

FOREIGN PATENT DOCUMENTS

| | | | |
|---|---|---|---|
| CN | 211576380 U | * | 9/2020 |
| JP | 2010190772 A | | 9/2010 |
| KR | 101435584 B1 | | 9/2014 |
| TW | 201217826 A1 | | 5/2012 |
| TW | I678549 B | | 12/2019 |

OTHER PUBLICATIONS

Clark ("Method and results from characterization of atmospheric properties with differential temperature methods" (2018). Theses. 253.) (Year: 2018).*
Wikipedia ("Gold plating." Wikipedia, The Free Encyclopedia. Wikipedia, The Free Encyclopedia, Jan. 26, 2021. Web. Nov. 9, 2022.) (Year: 2021).*
Coulman et al. ("Outer scale of turbulence appropriate to modeling refractive-index structure profiles," Appl. Opt. 27, 155-160 (1988)) (Year: 1988).*
Collis, ("Clear air turbulence detection," in IEEE Spectrum, vol. 3, No. 4, pp. 56-61, Apr. 1966, doi: 10.1109/MSPEC.1966.5216583) (Year: 1966).*
Gold Plating Services ("Scientific, Technical, and Special Purpose Gold Plating", Gold Plating Services, Mar. 16, 2019, https://web.archive.org/web/20190316092043/https://www.goldplating.com/pages/scientific-technical-and-special-purpose-gold-plating) (Year: 2019).*
Chaskakis, Experimental Analysis And Modeling Of Optical Turbulence In The Maritime Environment And Its Potential Effect On Laser Communications, Naval Postgraduate School, Dec. 2020 (Year: 2020).*

* cited by examiner

ATMOSPHERIC TURBULENCE DETECTION METHOD AND ATMOSPHERIC TURBULENCE DETECTION DEVICE

FIELD OF THE INVENTION

The present invention relates to an atmospheric turbulence detection technology, and more particularly to an atmospheric turbulence detection method and an atmospheric turbulence detection device that use the rapid response of a high-precision temperature difference element to detect the atmospheric turbulence.

BACKGROUND OF THE INVENTION

The turbulent movement of the atmosphere will cause random fluctuations in the refractive index of the atmosphere and may have a serious impact on the wireless optical communications and the transmission of lasers in the atmosphere. The atmospheric refractive index structure constant ($C_n^2$) is a quantitative description of the intensity of optical turbulence. The detection and analysis of the atmospheric refractive index structure constant ($C_n^2$) is conducive to accurately characterize the turbulence changes in different environments. Understanding the changing rule of the atmospheric refractive index structure constant ($C_n^2$) and accurately detecting it have great significance for studying the transmission of sound, light and electromagnetic waves, evaluating the performance of optoelectronic systems, and verifying turbulence models.

One of the current method of measuring the atmospheric refractive index structure constant ($C_n^2$) is to use a three-dimensional ultrasonic anemometer to calculate with Taylor's hypothesis, and the other is to use two platinum thermometers with a horizontal distance of about 1.5 meters to calculate the temperature difference at two points. The three-dimensional ultrasonic anemometer is difficult to manufacture due to energy loss and signal transmission and reception, so the cost is high. Although the method of horizontally using two platinum thermometers has high temperature observation accuracy, the two platinum thermometers have instrument uncertainty, and the device difference between the two platinum thermometers will directly affect the observation results. In addition, because the small-scale interference calculation requirements, the temperature difference accuracy of the two platinum thermometers needs to reach 0.001 degrees Celsius, which is difficult to manufacture and to achieve for the platinum thermometers.

SUMMARY OF THE INVENTION

The present invention provides an atmospheric turbulence detection method and an atmospheric turbulence detection device. The atmospheric turbulence detection method has the advantage of high detection sensitivity, and the atmospheric turbulence detection device has the characteristics of being portable, concise and easy to maintain. Thus, the atmospheric turbulence detection method and the atmospheric turbulence detection device can effectively reduce the cost of densely arranging points during atmospheric detection.

The atmospheric turbulence detection method provided by the present invention includes: providing a temperature difference measuring device, wherein the temperature difference measuring device includes a single thermocouple element with two sensing probes. There is an ambient distance between the two sensing probes of the thermocouple element, and the ambient distance is between 1 and 2 meters; placing the temperature difference measuring device in an atmospheric environment, wherein the thermocouple element generates an electromotive force by a temperature difference between the two sensing probes of the thermocouple element; and analyzing the electromotive force, wherein the electromotive force is converted into an ambient temperature difference of an environment where the two sensing probes of the thermocouple element are located, an atmospheric refractive index structure constant is calculated according to the ambient temperature difference and the ambient distance, and a value of the atmospheric refractive index structure constant corresponds to an ambient disturbance of an atmospheric turbulence.

In an embodiment of the present invention, a sampling frequency of the electromotive force is between 20 and 140 Hz.

In an embodiment of the present invention, when analyzing the electromotive force, the electromotive force is converted into a digital voltage value, and then the digital voltage value is converted into the ambient temperature difference.

In an embodiment of the present invention, the calculation of the atmospheric refractive index structure constant includes: calculating a temperature structure constant according to the ambient distance and the ambient temperature difference, and then converting the temperature structure constant into the atmospheric refractive index structural constant.

The atmospheric turbulence detection device provided by the present invention includes a support frame, a temperature difference measuring device and an analysis device. The temperature difference measuring device includes a thermocouple element with two sensing probes. The thermocouple element is installed on the support frame. The two sensing probes are respectively disposed at two end portions of the support frame. There is an ambient distance between the two sensing probes of the thermocouple element. The ambient distance is between 1 and 2 meters. The temperature difference measuring device is placed in an atmospheric environment. The thermocouple element generates an electromotive force by a temperature difference between the two sensing probes of the thermocouple element. The analysis device is installed on the support frame and electrically connected to the thermocouple element. The analysis device analyzes the electromotive force. The electromotive force is converted into an ambient temperature difference of an environment where the two sensing probes of the thermocouple element are located. An atmospheric refractive index structure constant is calculated according to the ambient temperature difference and the ambient distance. A value of the atmospheric refractive index structure constant corresponds to an ambient disturbance of an atmospheric turbulence.

In an embodiment of the present invention, the aforementioned atmospheric turbulence detection device further includes two radiation shields respectively disposed to cover the two sensing probes.

In an embodiment of the present invention, each of the sensing probes includes a copper substrate and a coating layer covering the copper substrate.

In an embodiment of the present invention, a material of the coating layer is gold.

In an embodiment of the present invention, the support frame and the thermocouple element are elongated. A length of the support frame corresponds to the ambient distance. The thermocouple element is fixed on the support frame.

The two sensing probes of the thermocouple element are respectively disposed at two opposite ends of the support frame.

In an embodiment of the present invention, the thermocouple element has a V-shaped structure and includes a first part and a second part. A connection between the first part and the second part of the thermocouple element is installed on the support frame. The two sensing probes of the thermocouple element are respectively located at ends of the first part and the second part of the thermocouple element away from the connection between the first part and the second part of the thermocouple element.

In an embodiment of the present invention, the aforementioned atmospheric turbulence detection device further includes two clamp elements respectively disposed at the two sensing probes of the thermocouple element to fix the two sensing probes.

In an embodiment of the present invention, the analysis device includes an analog-to-digital conversion circuit (ADC) instrumentation amplifier and a calculation module.

The thermocouple element of the present invention can obtain the temperature difference between the two sensing probes of the thermocouple element by using the thermoelectric effect between the temperature and the electromotive force, and the ADC instrument amplifier is integrated to analyze the electromotive force and diagnose small-scale and high-precision temperature changes in the environment.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWING

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
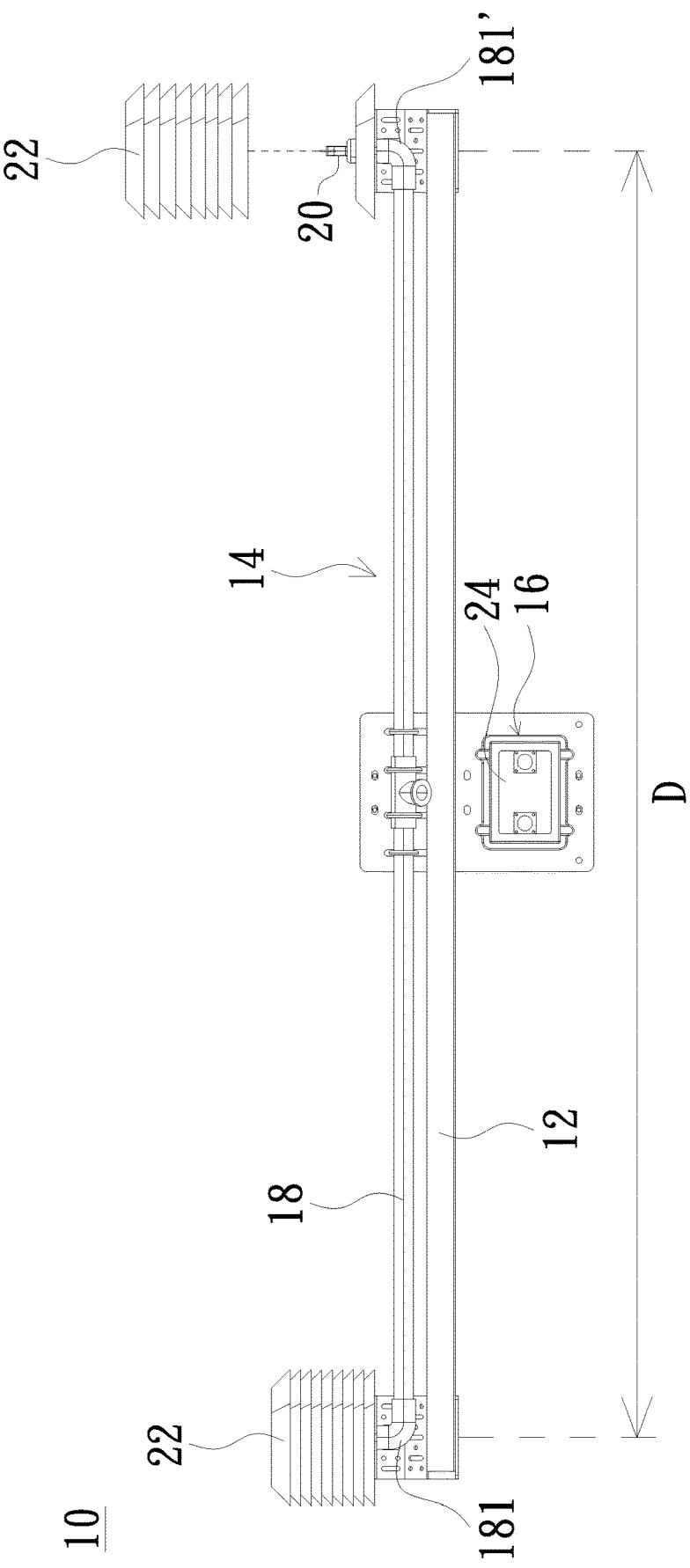
FIG. 1 is a schematic structural diagram of an atmospheric turbulence detection device according to an embodiment of the present invention.

FIG. 1 is a schematic structural diagram of an atmospheric turbulence detection device according to an embodiment of the present invention. As shown in FIG. 1, the atmospheric turbulence detection device 10 includes a support frame 12, a temperature difference measuring device 14 and an analysis device 16. The support frame 12 is slightly elongated and is, for example, a steel tube. The temperature difference measuring device 14 includes a thermocouple element 18 with two sensing probes 20 (only one of the sensing probes 20 is shown in FIG. 1). In one embodiment, the thermocouple element 18 is elongated and has two opposite end portions 181, 181'. There is an ambient distance D between the two sensing probes 20 of the thermocouple element 18, wherein the ambient distance D is between 1 and 2 meters, and preferably is 1.5 meters. The ambient distance D falls within the scale of atmospheric turbulence. The length of the support frame 12 roughly corresponds to or slightly greater than the ambient distance D. The thermocouple element 18 is, for example, placed horizontally on the support frame 12, and the two sensing probes 20 of the thermocouple element 18 are respectively disposed at the two opposite ends of the support frame 12 to sense temperature. When the temperature difference measuring device 14 is placed in an atmospheric environment, the thermocouple element 18 generates an electromotive force by the temperature difference sensed by the sensing probes 20.

In one embodiment, the sensing probe 20 may include a copper substrate (not labeled) and a coating layer (not labeled) covering the copper substrate. The material of the coating layer is, for example, gold, that is, gold is plated on the surface of the copper substrate to ensure the anti-oxidation ability of the sensing probe 20 in the environment without losing the sensitivity of the copper substrate to the air temperature. In one embodiment, the atmospheric turbulence detection device 10 further includes two radiation shields 22 respectively disposed to cover the two sensing probes 20 and fixed to the two ends of the support frame 12 to protect the sensing probes 20.

Follow the above description. The analysis device 16 is installed on the support frame 12 to analyze the electromotive force. In one embodiment, the analysis device 16 is, for example, installed in the middle of the support frame 12 and is electrically connected to the thermocouple element 18. The analysis device 16 includes an analog-to-digital conversion circuit (ADC) instrument amplifier 24 and a calculation module (not shown in FIG. 1). The analysis device 16 converts the electromotive force into an ambient temperature difference between the two end portions 181, 181' of the thermocouple element 18 and calculates the atmospheric refractive index structure constant ($C_n^2$) according to the ambient temperature difference and the ambient distance D. The value of the atmospheric refractive index structure constant ($C_n^2$) corresponds to the magnitude of the ambient disturbance of the atmospheric turbulence.

Figure 2:
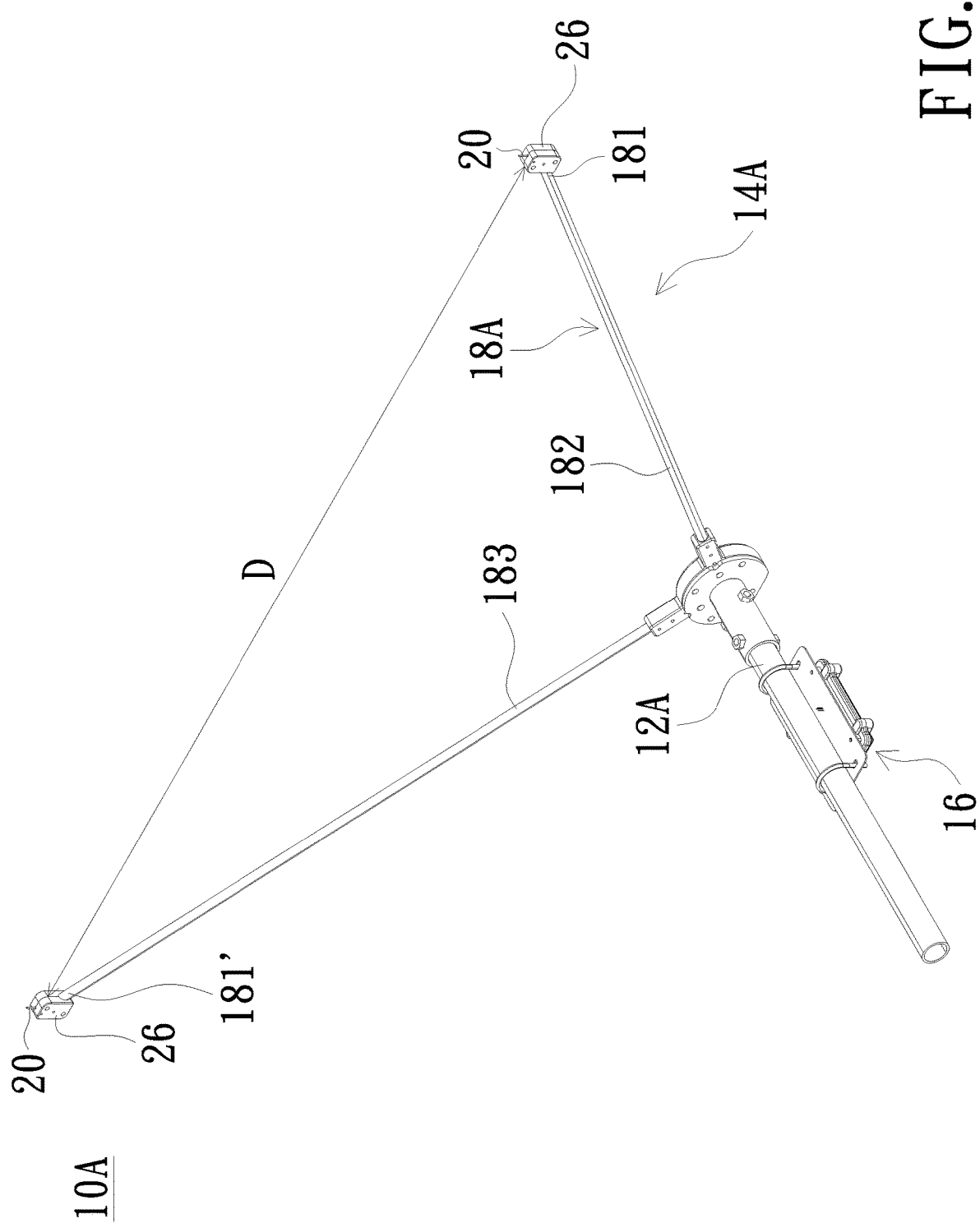
FIG. 2 is a schematic structural diagram of an atmospheric turbulence detection device according to another embodiment of the present invention.

FIG. 2 is a schematic structural diagram of an atmospheric turbulence detection device according to another embodiment of the present invention. As shown in FIG. 2, the atmospheric turbulence detection device 10A includes a support frame 12A, a temperature difference measuring device 14A and an analysis device 16. The temperature difference measuring device 14A includes a thermocouple element 18A and two sensing probes 20. The structure and arrangement of the support frame 12A and the thermocouple element 18A shown in FIG. 2 are different from those of the support frame 12 and the thermocouple element 18 shown in FIG. 1. In the embodiment shown in FIG. 2, the thermocouple element 18A has a V-shaped structure and includes a first part 182 and a second part 183. The connection between the first part 182 and the second part 183 is installed on the support frame 12A. The two end portions 181, 181' of the thermocouple element 18A are respectively located at the ends of the first part 182 and the second part 183 of the thermocouple element 18A away from the connection between the first part 182 and the second part 183. In another embodiment, the two end portions 181, 181' of the thermocouple element 18A may be respectively provided with clamp elements 26 for fixing the sensing probes 20.

Figure 3:
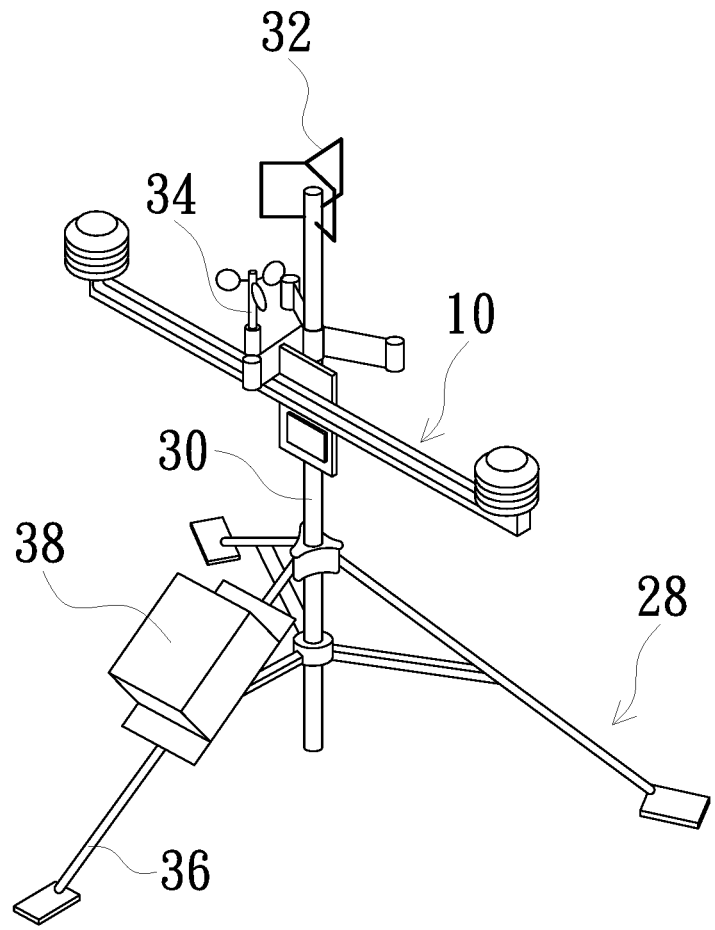
FIG. 3 is a schematic diagram of an application of the atmospheric turbulence detection device according to an embodiment of the present invention.

FIG. 3 is a schematic diagram of an application of the atmospheric turbulence detection device according to an embodiment of the present invention, wherein the atmospheric turbulence detection device 10 shown in FIG. 1 is taken as an example. As shown in FIG. 3, the atmospheric turbulence detection device 10 is installed on the center column 30 of the tripod 28. Optionally, the center column 30 can be further equipped with an ultrasonic anemometer 32 and a three-cup anemometer 34. A data logger 38 is installed on the foot 36 of the tripod 28.

Figure 4:
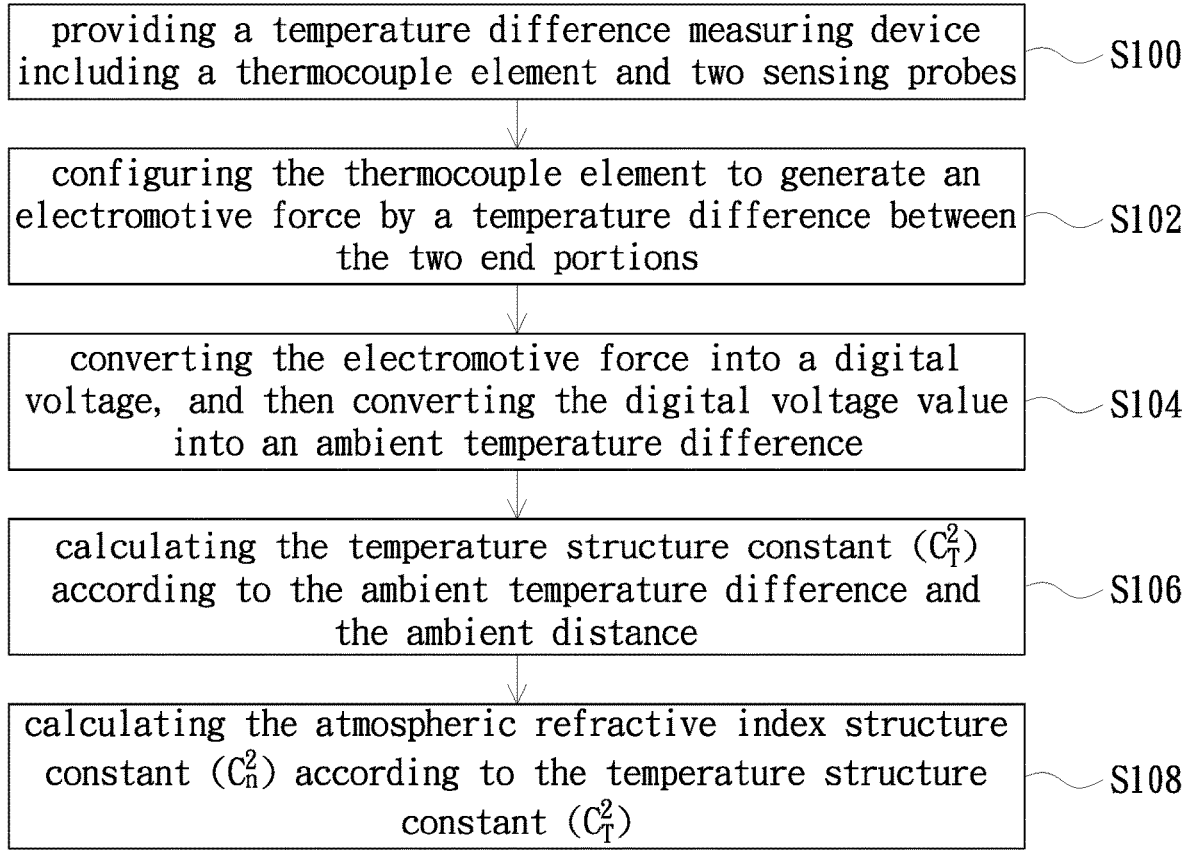
FIG. 4 is a schematic flow chart of an atmospheric turbulence detection method according to an embodiment of the present invention.

FIG. 4 is a schematic flow chart of an atmospheric turbulence detection method according to an embodiment of the present invention. As shown in FIG. 4, the atmospheric turbulence detection method includes steps S100 to S108. First, a temperature difference measuring device 14/14A is provided (step S100). Please refer to FIG. 1 or 2 at the same time. The temperature difference measuring device 14/14A includes a thermocouple element 18/18A and two sensing probes 20. The thermocouple element 18/18A has two opposite end portions 181, 181'. The two sensing probes 20 are respectively disposed at the two end portions 181, 181' of the thermocouple element 18/18A. There is an ambient distance D between the two end portions 181, 181' of the thermocouple element 18/18A, wherein the ambient distance D is between 1 and 2 meters. Then, the temperature difference measuring device 14/14A is placed in an atmospheric environment, and the thermocouple element 18/18A generates an electromotive force by the temperature difference between the two end portions 181, 181' of the thermocouple element 18/18A (step S102). Then, the electromotive force is sampled to analyze the electromotive force.

Follow the above description. In one embodiment, the sampling frequency of the electromotive force is between 20 and 140 hertz (Hz), that is, 20 to 140 pieces of electromotive forces are sampled per second. When analyzing the electromotive force, the electromotive force is first converted into a digital voltage, and then the digital voltage value is converted into an ambient temperature difference (step S104). Then, the temperature structure constant ($C_T^2$) is calculated according to the ambient temperature difference and the ambient distance D (step S106). In one embodiment, the temperature structure constant ($C_T^2$) is calculated by the known temperature structure function ($D_T(r)$), and the calculation formula is: $D_T(r) = \langle [T(x)-T(x+r)]^2 \rangle = C_T^2 r^{2/3}$, wherein r(m) is the ambient distance. Finally, the atmospheric refractive index structure constant ($C_n^2$) is calculated according to the temperature structure constant ($C_T^2$) (step S108). In one embodiment, the calculation formula of the atmospheric refractive index structure constant ($C_n^2$) is:

$$C_n^2 = \left(79 * 10^{-6} \frac{P}{T^2}\right)^2 C_T^2,$$

wherein P(hPa) is the pressure and T(K) is the temperature. Because the temperature and the atmospheric refractive index structure constant ($C_n^2$) change from the ambient turbulence, the value of the atmospheric refractive index structure constant ($C_n^2$) corresponds to the magnitude of the ambient disturbance, so that the atmospheric turbulence can be detected.

According to the above, in the atmospheric turbulence detection method of the embodiment of the present invention, the thermocouple element can obtain the temperature difference between the two sensing probes of the thermocouple element by using the thermoelectric effect between the temperature and the electromotive force, and the ADC instrument amplifier is integrated to analyze the electromotive force and diagnose small-scale and high-precision temperature changes in the environment. The atmospheric turbulence detection method in the embodiment of the present invention uses the rapid response (20 to 140 samples per second) of the high-precision temperature difference element (thermocouple element) to detect the atmospheric turbulence, and therefore has the advantage of high detection sensitivity. In addition, the atmospheric turbulence detection device in the embodiment of the present invention has the characteristics of lightness, simplicity and easy maintenance, which can effectively reduce the cost of densely arranging points during the atmospheric detection. Thus, the atmospheric turbulence detection device in the embodiment of the present invention is conducive to installation in the atmospheric environment, which is effectively applied to the evaluation of laser light path deviation, atmospheric research, farm and pasture ambient monitoring, forest flux measurement, and high-tech operating environments sensitive to turbulence, thereby having the advantage of high practicability.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An atmospheric turbulence detection method, comprising:
   providing a temperature difference measuring device, wherein the temperature difference measuring device comprises a single thermocouple element with two sensing probes, there is an ambient distance between the two sensing probes of the thermocouple element, and the ambient distance is between 1 and 2 meters;
   placing the temperature difference measuring device in an atmospheric environment, wherein the thermocouple element generates an electromotive force by a temperature difference between the two sensing probes of the thermocouple element; and
   analyzing the electromotive force, wherein the electromotive force is converted into an ambient temperature difference of an environment where the two sensing probes of the thermocouple element are located, an atmospheric refractive index structure constant is calculated according to the ambient temperature difference and the ambient distance, and a value of the atmospheric refractive index structure constant corresponds to an ambient disturbance of an atmospheric turbulence.

2. The atmospheric turbulence detection method according to claim 1, wherein a sampling frequency of the electromotive force is between 20 and 140 Hz.

3. The atmospheric turbulence detection method according to claim 1, wherein when analyzing the electromotive force, the electromotive force is converted into a digital voltage value, and then the digital voltage value is converted into the ambient temperature difference.

4. The atmospheric turbulence detection method according to claim 1, wherein the calculation of the atmospheric refractive index structure constant comprises: calculating a temperature structure constant according to the ambient distance and the ambient temperature difference, and then converting the temperature structure constant into the atmospheric refractive index structural constant.

5. An atmospheric turbulence detection device, comprising:
a support frame;
a temperature difference measuring device, comprising a single thermocouple element with two sensing probes, wherein the thermocouple element is installed on the support frame, and the two sensing probes are respectively disposed at two end portions of the support frame, there is an ambient distance between the two sensing probes of the thermocouple element, the ambient distance is between 1 and 2 meters, the temperature difference measuring device is placed in an atmospheric environment, and the thermocouple element generates an electromotive force by a temperature difference between the two sensing probes of the thermocouple element; and
an analysis device, installed on the support frame and electrically connected to the thermocouple element, wherein the analysis device analyzes the electromotive force, the electromotive force is converted into an ambient temperature difference of an environment where the two sensing probes of the thermocouple element are located, an atmospheric refractive index structure constant is calculated according to the ambient temperature difference and the ambient distance, and a value of the atmospheric refractive index structure constant corresponds to an ambient disturbance of an atmospheric turbulence.

6. The atmospheric turbulence detection device according to claim 5, further comprising two radiation shields respectively disposed to cover the two sensing probes.

7. The atmospheric turbulence detection device according to claim 5, wherein each of the sensing probes comprises a copper substrate and a coating layer covering the copper substrate.

8. The atmospheric turbulence detection device according to claim 7, wherein a material of the coating layer is gold.

9. The atmospheric turbulence detection device according to claim 5, wherein the support frame and the thermocouple element are elongated, a length of the support frame corresponds to or slightly greater than the ambient distance, the thermocouple element is fixed on the support frame, and the two sensing probes of the thermocouple element are respectively disposed at two opposite ends of the support frame.

10. The atmospheric turbulence detection device according to claim 5, wherein the thermocouple element has a V-shaped structure and comprises a first part and a second part, a connection between the first part and the second part of the thermocouple element is installed on the support frame, and the two sensing probes of the thermocouple element are respectively located at ends of the first part and the second part away from the connection between the first part and the second part.

11. The atmospheric turbulence detection device according to claim 10, further comprising two clamp elements respectively disposed at the ends of the first part and the second part to fix the two sensing probes.

12. The atmospheric turbulence detection device according to claim 5, wherein the analysis device comprises an analog-to-digital conversion circuit (ADC) instrumentation amplifier and a calculation module.

\* \* \* \* \*